Feb. 23, 1965    W. TOMASULO ETAL    3,171,034
ELECTRO-OPTICAL CONTROL
Filed Dec. 21, 1961
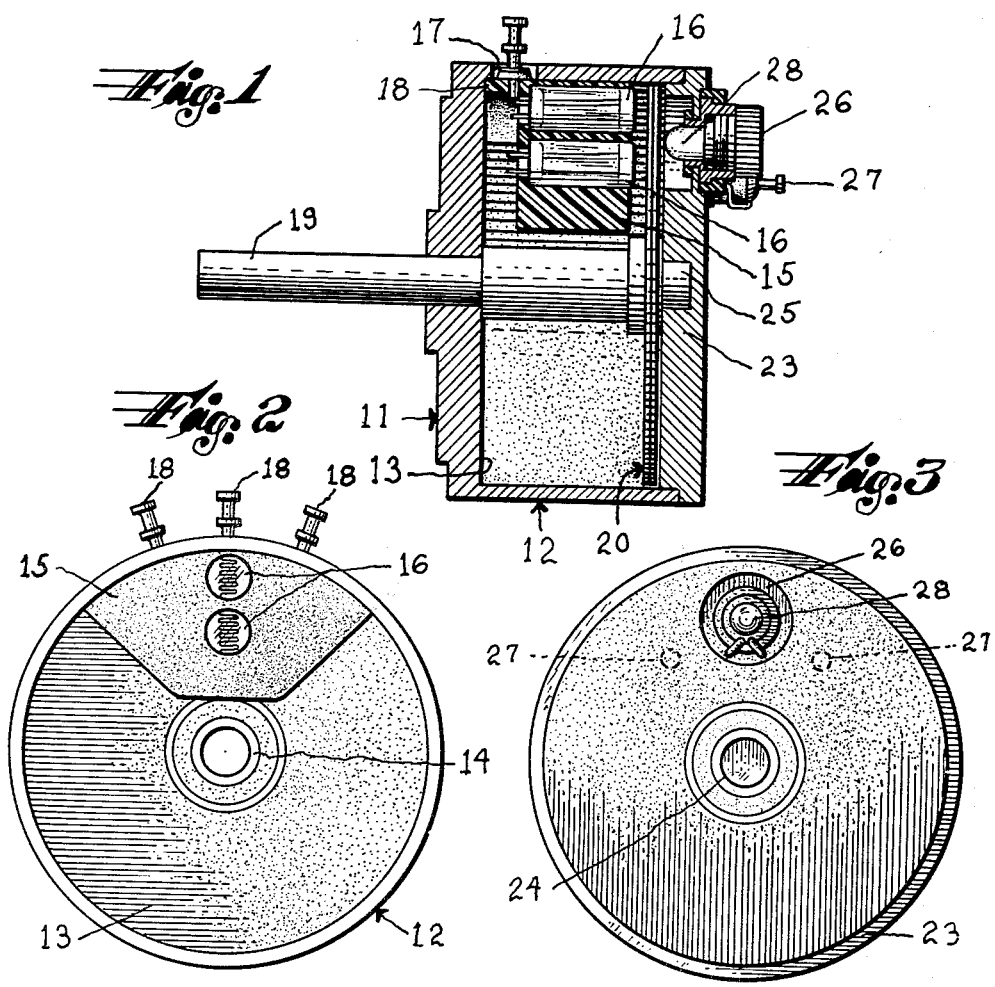
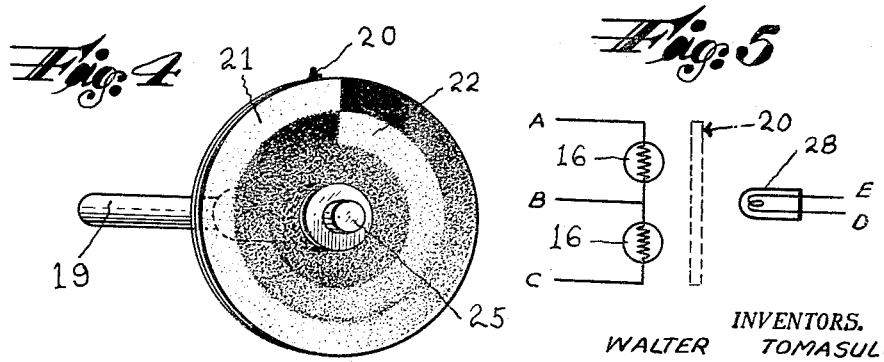
INVENTORS.
WALTER TOMASULO
GEORGE R. BROWN
BY
Norman H. Popper
ATTORNEY

United States Patent Office 3,171,034
Patented Feb. 23, 1965

3,171,034
ELECTRO-OPTICAL CONTROL
Walter Tomasulo, 390 Walnut St., Washington Township, Bergen County, N.J., and George R. Brown, 44 4th St., Emerson, N.J.
Filed Dec. 21, 1961, Ser. No. 161,081
3 Claims. (Cl. 250—237)

Our invention relates generally to electro-optical controls and specifically to a device in which the electrical characteristics are varied in response to the varying degrees with which light emanating from a light source is intercepted before it falls upon a photo-cell.

It is among the objects of our invention to provide an electro-optical potentiometer.

It is a further object of our invention to provide an electro-optical control in which there is no mechanical contact between the operative elements whereby the friction of wiper contacts, and the contact noise incidental thereto is eliminated.

It is yet a further object of our invention to provide a low friction electro-optical control.

A still further object is to provide an electro-optical control which may be hermitically sealed, and therefore resistant to contaminants, corrosion or moisture.

A still further object of our invention is to provide an electro-optical control which is durable, easily repaired, has parts which are subject to replacement or repair, and can operate at exceedingly slow speeds or exceedingly high rates of speed.

Among the further objects of our invention is to provide an electro-optical control which is infinitely variable in small gradations, or in abrupt steps, and which can be manufactured in exceedingly small sizes without imparing its durability and usefulness.

Still another object of our invention is to provide an electro-optical control device whose response characteristics can be easily and quickly varied by the simple and rapid substitution of a movable light penetrable member.

A still further object of our invention is to provide a device in which the control circuit is completely isolated and the operation of the device constant and stable under all conditions of vibration.

These objects and advantages as well as other objects and advantages may be achieved by the construction shown in the figures by way of illustration of the inventive concept in which FIGURE 1 is a vertical sectional view of an electro-optical control;

FIGURE 2 is a vertical elevational view of the inside of the housing thereof with the end plate and disc removed;

FIGURE 3 is a vertical elevational view of the end plate;

FIGURE 4 is a view in perspective of the light penetrable member; and

FIGURE 5 is a view of the potentiometer circuit used in the device shown in the prior figures.

It is desirable to have means by which the movement of any element can be translated into an electromotive force. Frequently, small increments of physical movement must control large increments of electromotive force, or large increments of physical movement must control small increments of electromotive force. It may also be desirable to vary the controlled electromotive force in a non-linear manner, cause it to increase, decrease, reverse, or abruptly cease in response to arithmetical or geometrical increases in physical movement. Thus, a linear physical movement can be converted to a linear or non-linear electromotive force, and a non-linear physical movement can be converted to a non-linear or linear electromotive force. The reverse is also possible. The use of such transducer may be extensive in guidance systems, missile systems, fuel control systems, and also has numerous electrical and electronic applications.

An electro-optical control that can perform these functions may, for example, consist of a light source, a photo-cell or light sensing cell whose electrical conductivity is responsive to the amount of light falling on it from the light source, and a member disposed in light interrupting relation to the light source. The member disposed in light interrupting relation to the light source and the photo-cell is of varying degrees of opacity in different areas, so that as it moves, it increases in linear, non-linear sinecosine, logarithmic, tapered or stepped relation, the amount of light that is passed to the photo-cell. A specific application, for example, would be a potentiometer in which a single incandescent lamp is positioned to illuminate two photo-cells, and the light interrupting member had a pair of light transmitting areas whose capacity to transmit light were inversely proportional to each other, each varying linearly from 0 to 100%, but the one inversely to the other. This is but one of the almost unlimited number of permutations of the elements that can be devised to carry out the present invention.

Referring now to the drawings in detail, our electro-optical control, may by way of illustration, be embodied in a potentiometer 11. There is provided a housing 12, which is generally tubular, and closed at one end by an end-wall 13. The end-wall 13 has a generally axial aperture in which a bearing 14 is mounted. A photo-cell support 15 is attached in the housing 12. The photo-cell support 15 has a pair of frontal bores in which a pair of photo-cell 16—16 are mounted. A slot 17 is provided in the housing 12 and an enlargement 17 of the support 15 closes this slot. The enlargement carries the three connecting posts 18, 18, 18 (A, B, C in circuit diagram FIGURE 5). A common terminal of each of the photo-cells 16, 16 is connected to the middle connecting post 18, and the remaining terminal of each photo-cell 16, 16 is connected to either of the remaining end connecting posts 18, 18.

A shaft 19 extends into the housing 12 and is carried by the bearing 14. The shaft 19 carries a light-interrupting disc or member 20 near one end. The member 20 has a pair of circular concentric tracks 21, 22. The outer track 21, clockwise varies through its entire 360° course from opacity to transparency. The inner track 22, clockwise varies through its entire 360° course from transparency to opacity. The start of the tracks 21, 22 are coincident in the same radius. It is to be noted that for other control effects, this relationship need not be used. The disc or member 20 is positioned for rotation immediately in front of the cells 16, 16 and the tracks 21, 22 are positioned on the member 20 so that they at all times register in correspondence with their respective cells 16, 16.

The open end of the tubular housing 12 is closed by an end plate 23. The end plate 23 has a central-depression which forms a seat for a bearing 24. This bearing supports the end of the shaft 25. The end plate 23 has an aperture in which is mounted a socket 26. A pair of insulated terminal posts 27, 27 (E, D in FIGURE 5) are mounted on the end plate 23, by which the power is supplied through the plate 23 to the socket 26. An incandescent lamp 28 is mounted in the socket 26.

In operation, the conductivity of the photo-cells 16, 16 is varied from zero to maximum inversely with respect to each other, by the amount of light from the lamp 28 falling upon each of the cells 16, 16 through the light control member or disc 20. The derived potentials of the leads A and C varies inversely with each other, and the device functions as a potentiometer as the shaft 19 is turned.

It may be observed that a single photo-cell may be used for making a rheostat. Cells may also be set up in pairs, each pair to receive the light from a single track (21 or 22).

The construction has numerous advantages. It is infinitely variable in an infinite number of degrees insofar as conductivity is concerned. The bearings enable it to operate smoothly with delicate, minimal forces applied to the shaft 19. If used in an electronic application, it introduces no sounds, from rubbing of contacts, into the circuit. It is not affected by vibration. Contact is continuous and does not deteriorate as from vibration or corrosion as in cases where a control finger traverses a resistance. It is friction free; delicate bearings are the only source of friction. It has relatively no inertia or resistance to movement. Speeds of operation, for example, a rotating disc, may be as high as 10,000 r.p.m. It can be sealed and made impervious to moisture, humidity, fluids, contaminants. Elements are readily replaceable. The life cycle is expected to be vastly extended. It may be miniaturized.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

Definitions

"Photo-cell" as used herein refers primarily to a photoconductive cell whose conductivity or resistance varies in accordance with the amount of light falling upon it. Such cells are available from the Clairex Corporation of New York, New York, and from several other sources. Photo-cell also may refer to a cell which converts light into electricity as an example of which the light meter's cadmium or selenium cell is typical. Numerous cells of this kind are commercially available. Photo-cell also refers to such devices regardless of the visibility of the light which it senses.

"Light Source" as used herein refers to incandescent lamps primarily, but also includes, fluorescent lamps, electroluminescence, radiation of all kinds, glow lamps, or other light generating means, regardless of the visibility, color, or frequency of its vibrations.

"Member" which interrupts light as used herein refers to light opaque or light transmitting materials such as tinted or untinted glass or plastic bodies, with gradations of opacity. It also refers to radiation shields of varying degrees of penetrability for use where the light source produces X-rays, gamma-rays, or other kinds of radiation.

What is claimed:
1. An electro-optical control comprising
   (a) an incandescent lamp for producing light of constant intensity,
   (b) a pair of photo-cells each positioned to receive at least a portion of light from the incandescent lamp,
   (c) a light penetrable imperforate disc mounted for rotation between the lamp and the cells,
   (d) tracks on the disc, each disposed to intervene between a cell and the lamp as the disc rotates, each having portions of varying light penetrability,
   (e) the cells varying in electrical conductivity in accordance with the amount of light reaching each of them through the disc,
   (f) the tracks varying in light penetrability inversely with respect to each other from maximum to minimum penetrability by the light passed to the cells,
   (g) the cells connected in an electrical circuit in series with a common lead between them.
2. An electro-optical control comprising
   (a) a lamp for producing light of constant intensity,
   (b) a pair of photo-cells each positioned to receive at least a portion of light from the lamp,
   (c) a light penetrable imperforate member movable between the lamp and the cells,
   (d) areas of light penetrability each varying inversely from maximum to minimum at a coterminal point on the said member in general correspondence with each of the photo-cells, as the member moves,
   (e) the cells varying in electrical conductivity in accordance with the amount of light reaching each of them through the member,
   (f) the photo-cells connected in an electrical circuit.
3. An electro-optical control comprising
   (a) a light impenetrable housing,
   (b) a light source of constant intensity in the housing positioned to direct light upon a pair of photocells,
   (c) a pair of photocells in the housing positioned to receive at least a portion of light from the light source and positioned radially with respect to a light penetrable disc,
   (d) an imperforate light penetrable disc mounted for rotation between the light source and the photocells,
   (e) portions of the disc defining tracks in general coincidence with the photocells, and intervening between the photocells and the lamp at all times during rotation of the disc, and each track having inversely varying light penetrability with respect to the other,
   (f) the photocells varying in electrical conductivity in accordance with the amount of light reaching them through the disc,
   (g) the photocells connected in an electrical circuit in series with a common lead between them, the tracks having maximum and minimum opaque portions disposed coterminal with each other.

References Cited by the Examiner
UNITED STATES PATENTS

| | | | |
|---|---|---|---|
| 1,834,405 | 12/31 | Kosken | 250—219 |
| 1,985,044 | 12/34 | Lyle | 250—208 X |
| 2,065,365 | 12/36 | Doyle et al. | 250—209 |
| 2,565,745 | 8/51 | Skalka | 250—233 X |
| 2,604,528 | 7/52 | Obermaier | 250—233 X |
| 2,858,449 | 10/58 | Burr | 250—83.6 |
| 2,884,536 | 4/59 | Swift | 250—233 X |
| 2,896,086 | 7/59 | Wunderman | 250—211 |
| 3,068,692 | 12/62 | Morgan | 250—233 X |
| 3,086,122 | 4/63 | Jones | 250—233 X |
| 3,102,227 | 8/63 | De Gier | 250—209 X |

OTHER REFERENCES

"Potentiometer-Infinite Resolution, Low Noise," Electronics, vol. 34, No. 32, Aug. 11, 1961, page 178.

RALPH G. NILSON, *Primary Examiner.*